Oct. 29, 1968　　　　　　　R. D. CARR　　　　　　3,408,500
RADIATION SENSITIVE SPEED MEASURING DEVICE
Filed March 4, 1966
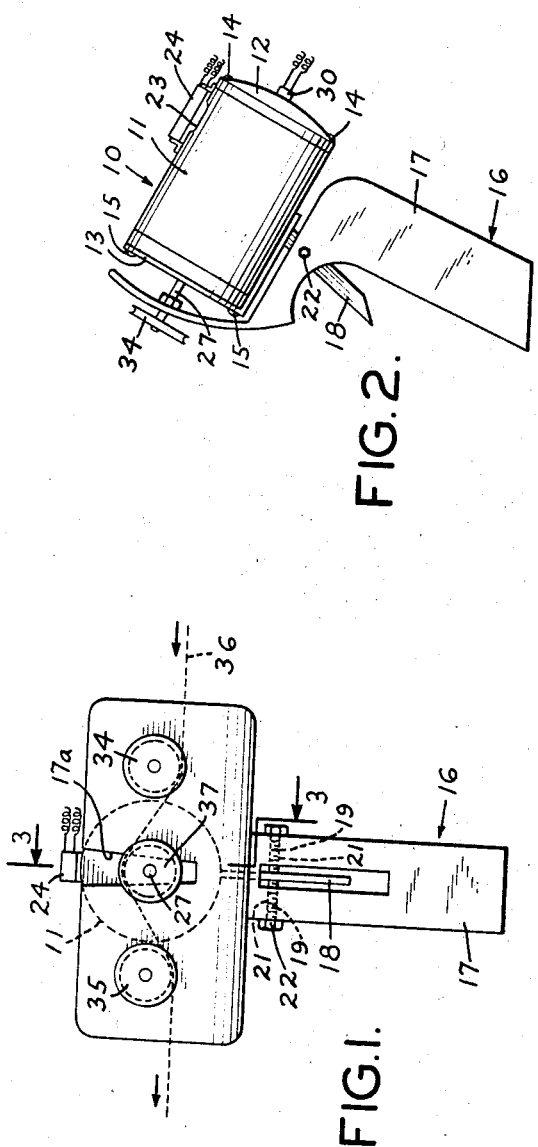
INVENTOR
ROBERT D. CARR
BY
*Clement J. Vicari*
ATTORNEY

United States Patent Office 3,408,500
Patented Oct. 29, 1968

3,408,500
RADIATION SENSITIVE SPEED MEASURING DEVICE
Robert D. Carr, Hopewell, Va., assignor to Allied Chemical Corporation, New York, N.Y., a corporation of New York
Filed Mar. 4, 1966, Ser. No. 531,810
4 Claims. (Cl. 250—219)

This invention relates to a yarn speed measuring device.

Prior art devices for measuring the running speed of a yarn have been generally designed so that the speed of the roll over which the yarn passes is measured and the speed of the yarn is thereafter determined based on the dimensions of the roll, the speed of rotation of the roll and like factors. Although these prior art devices are generally satisfactory, it is still, however, difficult to accurately determine, in a simple manner, the speed of a running yarn because of slippages, friction, and the like.

It is an object of the present invention to provide a yarn speed measuring device which is simple to operate. Another object is to provide a yarn speed measuring device having a high degree of accuracy. Other objects and advantages will be apparent from the following description.

In accordance with the present invention, the yarn speed measuring device comprises a housing including a cylindrical casing and a front and back wall, a mounting assembly including a bracket and a pivotal member pivotably connected to said bracket and rigidly secured to said housing and being adapted to vary the position of said housing with said bracket, an elongated slot extending through said casing, a photocell attached to said casing and disposed over said elongated slot, a rotatable shield concentrically disposed within said casing having a pair of diametrically opposed slots extending through the periphery of said shield, a light source disposed through said back wall of said housing and within said shield, a pair of yarn guiding rolls in contact with a running yarn, and means associated with said running yarn, guide rolls, shield and housing for periodically alternately aligning one of said slots in said shield with the slot in said casing to permit light impulses from said light source to pass through said slots in contact with said photocell at a frequency of time depending on the yarn speed travel, and a read-out instrument associated with said photocell to correlate the frequency of light impulses with the speed of yarn travel.

For a clearer understanding of the invention, reference is made to the drawings, wherein:

FIGURE 1 is a front view of the apparatus showing the path of a running yarn;

FIGURE 2 is a side view showing the yarn speed measuring device mounted on a mounting assembly and;

FIGURE 3 is a view in section with parts broken away and which is taken along line 3—3 of FIGURE 1.

Referring to FIGURES 2 and 3, it will be seen that the apparatus includes a housing 10 having a casing 11 of substantially cylindrical configuration, a back wall 12 and a front wall 13. The back wall 12 is attached to the casing by means of screws 14 which pass through the outer rim of the back wall in registering relation with corresponding threaded recesses in the casing 11. In a similar manner, threaded screws 15 pass through the front wall 13 and register with threaded openings in the casing to enclose a substantially cylindrical area formed by the casing 11, the front wall 13 and the back wall 12.

The housing is supported by a mounting assembly 16 which includes a bracket 17 and a pivotal member 18. The upper portion of the bracket is C-shaped and extends transversely on each side of the housing as shown in FIGURE 1. As will best be seen in FIGURE 1, a pair of threaded rods 19 are disposed, one on each side of the pivotal member and pass through openings 21 of the bracket. The positioning of the housing with respect to the bracket can be varied and the desired position maintained by tightening nuts 22 on the threaded rods 19 and against the face of bracket 17 as shown in FIGURE 1. As will be seen the pivotal member may pass through the slot 17a in the bracket 17 to permit positioning of the housing.

Referring to FIGURE 3, it will be seen that there is an elongated slot 23 which extends through the casing and is positioned directly under a photocell 24 mounted on the casing, so that any light which passes through the elongated slot 23 also contacts the photocell 24. The type photocell employed may be any one of a variety of conventional-type photocells now on the market. Merely as illustrative, there may be employed a photocell which is known commercially as a Gem Power Master Type CDS–10.

Concentrically disposed within the casing 11 is a rotatable shield 25 of substantially cylindrical configuration and which has a pair of diametrically opposed slots 26 extending through the periphery of the shield. The slots are positioned with respect to the shield so that when the shield is rotated, the slots will traverse a path which will periodically place one of the slots 26 under and in alignment with the slot 23 on the casing.

Fixedly mounted with respect to the shield 25 is a shaft 27 which passes through a collar 28 attached to the wall 29 of the shield and which extends a short distance beyond the wall 29 of the shield 25. The shaft is fixedly mounted with respect to the shield by means of a threaded bolt 31 which threadedly engages a threaded opening in the collar 28 and which may be pressure positioned against the shaft so as to hold the shaft securely within the collar and consequently rigid with respect to the shield 25.

The shield 25 may be rotated within the casing 11 by means of shaft 27 rotating in bearings 32 and 33 which are positioned in the front wall 13 of the casing 11.

Rigidly supported at approximately the center of the back wall 12 is a light source shown in the drawing as being a light bulb 20 and socket 30 which receives its energy from a source, not shown. It will be seen that the light bulb is positioned so as to be disposed within the rotating shield 25 and the light from the light bulb energizes the photocell 24 at a time when one of the slots 26 on the rotating shield 25 is in alignment with the slot 23 on the casing 11.

Referring to FIGURE 1, located on each side of the housing 10 and mounted for rotation on the upper part of the bracket 17 are a pair of guide rolls 34, 35. These guide rolls contact a running yarn 36 and guide the yarn around driving roll 37 which is rigidly fixed on shaft 27. The running yarn traverses a path as shown in FIGURE 1 and causes the driving roll 37 to rotate, and with it the shield 25 located within the housing. The rotation of the shield periodically alternately aligns one of the slots 26 in the shield 25 with the slot 23 in the casing 11 and permits light impulses from the light bulb 20 to pass through one of the slots in the shield, through the slot in the casing and in contact with the photocell 24. The photocell produces an electrical signal which is sent to a digital read-out instrument, not shown, to correlate the frequency of light impulses with the speed of yarn travel. Merely as illustrative, if the circumference of the driving roll 37 were two inches, then each electrical signal from the photocell would be equal to one inch of yarn travel. This is because each revolution of the driving roll would cause one complete revolution of the shield and since there are two diametrically opposed slots in the shield, there would be two light signals or impulses to the photocell and two signals from the photocell to the digital read-out instrument. These impulses are counted for a pre-selected time period by the read-out instrument and converted to yarn speed travel.

The digital read-out instrument employed in the present invention may be any of a variety now available on the market. Merely as illustrative, there may be employed a digital read-out instrument known commercially as a Hewlett Packard Model 5512 A.

In a representative technique, the running speed of a yarn may be determined by guiding the yarn around guide rolls 34 and 35 and around the driving roll 37 as shown in FIGURE 1 of the drawings. The required pressure exerted by the yarn against the driving roll 37 may be regulated by loosening the nuts 22 and pivotably raising or lowering the front of the housing as desired. When the desired pressure is exerted to cause contact of the yarn 36 with the driving roll 37, the nuts 22 are tightened against the bracket 17. The running yarn then rotates the driving roll which in turn rotates the shaft 27 and shield 25. It is desirable before operation, that the slots 26 be aligned with the slot 23 in the casing to prevent inaccuracy which would result if, for example, the slots 26 were positioned before or after the slot 23 in the casing; the amount of inaccuracy being the distance traveled from the position of the slot 26 at the point of beginning to the position directly under slot 23. The bulb 20 which had been energized prior to start up sends two light impulses to the photocell for each rotation of the shield and these impulses are relayed to a read-out instrument which converts the impulses to measured yarn speed.

The yarn speed measuring device was evaluated in connection with a conventional textile draw-winder and apparatus for yarn crimping (termed CR unit) wherein the true speed of the running yarn at a specified point on these apparatus was known. The yarn speed measuring device employed a driving roll having a 2.0 inch circumference. Nine determinations were made of the measured speed of the yarn. On the draw-winder, the time measured was for a period of ten seconds whereas on the CR unit the time measured was for a period of one second. The results shown in feet per minute are indicated in the following table.

TABLE

| Draw-Winder | | CR-Unit | |
|---|---|---|---|
| Measured Speed, F.P.M. 10 Sec. | True Speed, F.P.M. | Measured Speed, F.P.M. 1 Sec. | True Speed, F.P.M. |
| 568 | 570 | 700 | 695 |
| 568 | 570 | 695 | 695 |
| 568 | 570 | 710 | 695 |
| 569 | 570 | 695 | 695 |
| 567 | 570 | 700 | 695 |
| 567 | 570 | 695 | 695 |
| 568 | 570 | 700 | 695 |
| 570 | 570 | 690 | 695 |
| 567 | 570 | 695 | 695 |
| 568 Average .35% Error | | 698 Average .43% Error | |

From the above table, it may be seen that the measured yarn speed is in close agreement with the true speed. It may also be seen that the longer measuring time increases the accuracy. From the CR measurement which represents a measuring time of one second, it may be noted that an error in measurement of ±2 units would represent ±10 F.P.M. This error may be reduced by making the measuring time 10 seconds, as shown in the draw-winder results.

Although certain preferred embodiments of the invention have been disclosed for purpose of illustration, it will be evident that various changes and modifications may be made therein without departing from the scope and spirit of the invention.

I claim:
1. A yarn speed measuring device comprising a housing including a cylindrical casing and a front and back wall, a mounting assembly adapted to support and to vary the position of said housing, an elongated slot extending through said casing, a photocell attached to said casing and disposed over said elongated slot, a rotatable shield having a wall at one end, said shield being concentrically disposed within said casing having a pair of diametrically opposed slots extending through the periphery of said shield, a light source disposed through said back wall of said housing and within said shield, a pair of yarn guiding rolls in contact with a running yarn, and rotating means associated with said running yarn, guide rolls, shield and housing for periodically alternately aligning one of said slots in said shield with the slot in said casing to permit light impulses from said light source to pass through said slots in contact with said photocell at a frequency of time depending on the yarn speed travel, and a read-out instrument associated with said photocell to correlate the frequency of light impulses with the speed of yarn travel.

2. A yarn speed measuring device according to claim 1 wherein said mounting assembly includes a bracket and a pivotal member pivotably connected to said bracket and rigidly secured to said housing and said shield.

3. A yarn speed measuring device according to claim 2 wherein said pivotal member has a pair of threaded rods disposed one on each side of the pivotal member and which pass through said bracket.

4. A yarn speed measuring device according to claim 2 wherein said rotating means includes a driving roll in contact with said running yarn, a shaft rigidly secured to said driving roll and extending through the wall in said shield, a collar attached to said wall through which said shaft passes, and a threaded bolt which threadably engages a threaded opening in said collar and which may be pressure positioned against said shaft so as to hold said shaft securely within said collar and rigid with respect to said shield.

References Cited

UNITED STATES PATENTS

| 2,084,267 | 6/1937 | Hicks | 250—233 X |
| 2,594,741 | 4/1952 | Dexter | 250—236 X |
| 2,929,023 | 3/1960 | Mishcon et al. | 324—70 |
| 3,184,820 | 5/1965 | Kanbar | 66—132 X |

WALTER STOLWEIN, *Primary Examiner.*